3,125,611
PROCESS FOR THE SEPARATION OF OLEFINIC HYDROCARBONS USING A SILVER SALT MODIFIED BY PENTAVALENT VANADIUM IONS
George Clarke Monroe, Jr., Orange, Tex., assignor to E. I. du Pont de Nemours and Company, Wilmington, Del., a corporation of Delaware
No Drawing. Filed May 9, 1962, Ser. No. 193,617
5 Claims. (Cl. 260—677)

The present invention relates to a process of separating olefinic hydrocarbons from hydrocarbon mixtures, and, more particularly, to a process for separating olefinic hydrocarbons from hydrocarbon mixtures employing absorption and desorption techniques.

It has recently been discovered that aqueous solutions of silver fluoborate and/or silver fluosilicate are capable of selectively absorbing olefins from fluid, i.e., gaseous or liquid, mixtures thereof with saturated hydrocarbons, and that the absorbed olefin can be subsequently recovered by heating the aqueous silver fluoborate or silver fluosilicate solution. Alternate methods of recovery, which may be combined with each other or with a heating step, comprise dilution and reduction of pressure. On desorption, the silver salt solution is recycled to the absorption zone. This process, therefore, provides a simple method for the separation of olefins from hydrocarbon streams. The process can be carried out on a batch scale or on a continuous scale using countercurrent streams of the hydrocarbon and the absorbing salt solution.

It was further discovered that a synergistic improvement in olefin absorption can be achieved if a secondary fluoborate or fluosilicate is added. The metal in the secondary metal salt is one that has a charge to ionic radius ratio of greater than one. The ratio of charge or valence to ionic radius is readily calculated from published data. Thus, both can be found in Therald Moeller's advanced textbook, "Inorganic Chemistry," published by John Wiley and Sons, Inc. (1952), on pages 140 to 142. In particular, the metals of group II of the periodic table of elements having atomic numbers from 4 to 56 inclusive, and copper, lead and lithium are highly suitable. The concentration of the silver salt employed in this process generally varies from 4 to 12 molar and that of the secondary metal salt is generally equal to or less than the concentration of the silver salt. In order to maintain such concentrations in solution, it is generally preferred to maintain the pH of the solutions below two, which is accomplished by the addition of fluoboric acid or hydrogen fluoride, or a combination of the two. One of the difficulties encountered in the operation of this process of separating olefins from saturated hydrocarbons results from the presence of hydrogen which is found in most hydrocarbon streams containing the aforesaid mixture of saturated and unsaturated hydrocarbons. Hydrogen causes the reduction of the silver ion to metallic silver which precipitates out of the solution, thereby decreasing the efficiency of the solution and requiring additional periodic maintenance to remove the precipitated silver from the absorbing equipment. Although hydrogen peroxide or nitric acid can be added to the absorbing solution to oxidize any reduced silver back to the ionic state, such an oxidation results in gaseous side products which tend to contaminate the hydrocarbons obtained on separation.

It is, therefore, an object of the present invention to provide an improved method for the separation of hydrocarbons using a silver salt process. It is a further object of the present invention to provide a method for preventing the hydrogen reduction of silver in a hydrocarbon separation process which is based on the use of silver fluoborate and/or silver fluosilicate. It is another object of the present invention to provide such a process without contaminating the separated hydrocarbons. Other objects will become apparent hereinafter.

The objects of the present invention are accomplished by a process which comprises passing a fluid hydrocarbon stream of a mixture of saturated hydrocarbons and olefinic hydrocarbons through an aqueous solution of silver fluoborate or silver fluosilicate containing pentavalent vanadium ions. The term "olefinic hydrocarbon" as employed herein is used to define any hydrocarbon containing ethylenic unsaturation. The present invention is based on the discovery that pentavalent vanadium ions prevent the reduction of silver ions to silver by hydrogen while being themselves reduced to the tetravalent state. The ability of vanadium to be reduced to the tetravalent state in the presence of the absorbing solution was found to be substantially unique to vanadium. A large number of polyvalent metal ions were found to be unsuitable for this purpose. The advantage of using vanadium in the process of the present invention is, of course, the fact that in the reduction of vanadium from a pentavalent to a tetravalent state, no decomposition or side products are formed. The tetravalent vanadium ion may subsequently be oxidized back to the pentavalent state by reaction with hydrogen peroxide or nitric acid in a separate regeneration step, which is carried out after the absorbed olefin has been desorbed from the solution. An additional advantage of using the vanadium is that it can be employed over a much wider temperature range than either hydrogen peroxide or nitric acid which tend to decompose at the higher temperatures. Although it is extremely difficult or impossible to dissolve vanadium compounds directly in aqueous solutions of silver fluoborate containing fluoboric acid, it was found that a sufficient concentration of vanadium ions could be obtained by dissolving a vanadium compound in concentrated hydrofluoric acid solutions and then adding such a solution to the silver fluoborate or fluosilicate absorbing solutions.

The concentration of the vanadium ion will differ with the hydrogen concentration of the hydrocarbon stream to be separated. In general, the concentration of the vanadium should be sufficient to prevent the reduction of silver and should not be so high as to cause the precipitation of either silver fluoborate or vanadium fluoborate during the operation of the process. The minimum and maximum concentrations of the vanadium ions will thus differ with the process conditions employed and optimum concentrations are best established by small scale tests in which a vanadium ion containing silver fluoborate solution is exposed to hydrogen at the pressure and temperature conditions visualized for the process. In general, it was found that a concentration of 0.04 to 0.4 weight percent of pentavalent vanadium ions based on the silver salt solution will prevent the precipitation of silver metal when such a solution is treated with hydrogen under conditions prevalent in the process. The vanadium ion was found to be most effective at temperatures of 25 to 70° C.

As indicated hereinabove, the vanadium ion is not readily soluble in the silver salt solution. In order to maintain the vanadium ion in the solution, it is necessary to employ a silver salt solution which is at least 0.3 molar with respect to hydrogen fluoride. Although there is no upper limitation on the concentration of the hydrogen fluoride in regard to the operability of the process, concentrations in excess of 3 molar are generally not employed. The concentration of the silver salt, the secondary metal salt and any hydrofluoboric acid is in accordance with concentrations described in the literature. Thus, the concentrations of the silver fluoborates or the silver fluosilicate vary from 4 to 12 molar on the basis of the silver ions. The concentration of the hydrofluoboric acid in general varies from 0 to 2 molar and the concentration of the secondary metal salt in a ratio of 1:1 to 1:10 of the silver salt.

Since the mechanics involved in separating olefinic hydrocarbons from saturated hydrocarbons have been described in the literature, i.e., U.S. Patent 2,913,505, issued November 17, 1959, to H. G. Van Raay et al., and U.S. 3,007,981, issued November 7, 1961, to B. B. Baker and D. F. Knaack, their description is not deemed to be necessary here. The regeneration of vanadium in the tetravalent state to the pentavalent state using nitric acid may suitably be combined with the regeneration of silver ion from silver acetylide which is formed in the absorbing step by the reaction of acetylenes in the hydrocarbon stream during the absorption step. The regeneration of silver ions from silver acetylide is described in greater detail in copending application Serial No. 114,635, filed June 5, 1961.

The following examples further illustrate the effectiveness of pentavalent vanadium in preventing the reduction of silver ion in the presence of an absorbed olefin.

*Example I*

Vanadium pentoxide, 0.5 g., was dissolved in 1 ml. of 50% aqueous hydrofluoric acid and the resulting solution was diluted with 4 ml. of distilled water. There was then added 2 ml. of the resulting solution to 20 ml. of 7 M $AgBF_4$—2 M $HBF_4$. This solution was heated at 100° C. for 3 min., during which time a small amount of dark precipitate formed. After cooling, the solution was filtered and assumed a yellow color. Three 5 ml. portions of this solution were saturated with ethylene at room temperature, and then sparged with 100 ml./min. of hydrogen at atmospheric pressure, at temperatures of 25° C., 55° C., and 70° C. During the treatment with hydrogen, the color of the solutions changed from yellow to green to blue, until finally a precipitate formed. At 25° C., the precipitate formed in 99 minutes, at 55° C., in 13.5 minutes, and at 70° C., in 6.75 minutes. The precipitate was found to be metallic silver. In the absence of pentavalent vanadium, silver precipitates were formed on treating the solution with 100 ml./min. hydrogen at atmospheric pressure in 12 minutes at 25° C. and in 1–2 minutes at 55° C.

Substantially the same results are obtained using a 7 M $AgBF_4$—1.6 M $Mg(BF_4)_2$—2 M $HBF_4$ solution.

*Example II*

An $AgBF_4$ solution (5 ml.) prepared as described in Example I was treated with 100 ml./min. of hydrogen at atmospheric pressure and 55° C. A silver precipitate formed in 14.5 min. At this point 0.025 ml. of 70% nitric acid was added. The precipitate dissolved during 2 min. at 55° C. leaving a clear blue solution. On warming to 70° C. the solution turned clear green. On further treatment with hydrogen at 55° C., a precipitate formed in 36 min. While the hydrogen sparge was maintained, another 0.025 ml. of 70% nitric acid was added. The precipitate dissolved during 2 min. leaving a clear blue solution which lasted for 23 min. on exposure to hydrogen before a silver precipitate formed.

*Example III*

Vanadium pentoxide (1 g.) was dissolved in 8 ml. of 50% aqueous HF. To 2 ml. of the resulting solution was added 20 ml. of 7 M $AgBF_4$—2 M $HBF_4$. The resulting solution which was nearly colorless was heated at boiling point until the solution turned yellow. No precipitation occurred. A portion of this solution (5 ml.) was treated with 100 ml./min. of hydrogen at 55° C. and a silver precipitate formed in 15 min. The mixture was then treated with 0.3 ml. of 30% hydrogen peroxide. The solution cleared and was heated at 100° C. to decompose excess peroxide. On retreatment with hydrogen the solution lasted for 10 min. before silver precipitation occurred.

*Example IV*

A portion (5 ml.) of the original $AgBF_4$ solution from Example III (before exposure to hydrogen) was treated with 100 ml./min. of hydrogen at 55° C. for 12 min. At this point the solution was still clear. It was then exposed to 100 ml./min. of oxygen at 90° C. for 15 min. (All exposures to gas were at atmospheric pressure.) The solution lasted for an additional 9 min. before a silver precipitate formed. Without the oxygen treatment the solution lasted for a total of 21 min.

*Example V*

An $AgBF_4$ solution prepared as described in Example I was found to last 13.5 min. on treatment with 100 ml./min. of hydrogen at atmospheric pressure and 55° C. before a silver precipitate occurred. A 5 ml. portion of the same solution was treated with 0.5 ml. of 50% aqueous HF and then heated at the boiling point until the colorless solution turned yellow. This solution on exposure to hydrogen lasted 21 min. before a precipitate formed. Another 5 ml. portion of the solution prepared as described in Example I was treated with 0.5 ml. of 50% aqueous HF, not heated, but exposed to hydrogen at 55° C. directly. Precipitation occurred in 12 min.

*Example VI*

A 5 ml. portion of a solution prepared as described in Example I was treated with 100 ml./min. of a gas mixture comprising 50% ethylene, 35% hydrogen, and 15% methane at 55° C., and atmospheric pressure. A silver precipitate formed in 28.5 min. A similar result is obtained when the silver fluoborate solution is modified by the addition of $Mg(BF_4)_2$. In the absence of pentavalent vanadium, a silver precipitate is formed in less than 5 min.

*Example VII*

A 2 ml. portion of a solution made by dissolving 2 g. of $V_2O_5$ in 30 ml. of 50% HF was added to 10 ml. of 7 M $AgBF_4$—2 M $HBF_4$. This solution was diluted with varying amounts of 7 M $AgBF_4$—2 M $HBF_4$ solution to obtain varying concentrations of pentavalent vanadium in the solutions. All solutions were heated before testing until they turned yellow. The solutions were tested at 100 ml./min. of hydrogen at 55° C. and atmospheric pressure. The solution containing 0.37% vanadium formed a silver precipitate in 15.3 min., that containing 0.15% in 11.7 min., 0.074% in 8 min., and 0.037% in 6 min.

*Example VIII*

A 0.5 ml. portion of a solution containing 2 g. of $V_2O_5$ in 30 ml. of 50% HF was added to 5 ml. of 12.8 M $AgBF_4$. The resulting solution was heated to drive off some of the HF and to turn the solution yellow. Treatment of this solution with 100 ml./min. of hydrogen at 55° C. and atmospheric pressure resulted in precipitation after 18 min. In the absence of the vanadium, silver precipitation occurred in less than 2 min.

*Example IX*

About 180 ml. of an $AgBF_4$ solution containing vanadium (pentavalent) and prepared as described in Example I, was treated with enough 70% nitric acid to make .35% solution of nitric acid. The solution was charged into a metal unit designed to circulate the solution continuously under pressure. In one section of the unit the solution was exposed to a gas mixture comprising 12.7% hydrogen, 32.4% methane, 4.9% propane, 48.9% ethylene and 1.1% propylene at 35° C. and 300 p.s.i. After exposure the solution was circulated to another section of the unit where it was heated to 65° C. and the pressure reduced to atmospheric pressure in order to desorb olefins. It was then recirculated for reexposure to the gas mixture. Operation was continued for 5 hrs. Nitric acid was added periodically to keep its concentration in the range of .35–.7%. No silver precipitate formed during the run and there was no evidence of precipitate in the solution at the end of the run. The solution at the end of the run was a clear green color. Substantially complete separation of the olefins from the saturated hydrocarbons was achieved.

In similar runs made with solutions which contained no vanadium, silver precipitation occurred almost immediately after start-up. Although the regeneration of the pentavalent vanadium is illustrated in this example as occurring in the process stream, the regeneration can, of course, be carried out in a separate step and is desirable if contamination of the separation products is to be avoided.

The foregoing examples have illustrated the effectiveness of pentavalent vanadium in preventing the formation of the silver precipitate as a result of hydrogen reduction of silver ion in a hydrocarbon separation process based on the use of silver fluoborate. Although the invention has been described with particular emphasis on the silver fluoborate solution, it is to be understood that similar results are obtained when a silver fluosilicate solution or a mixture of a silver fluoborate and silver fluosilicate solution is employed in the separation of hydrocarbons using the above-described methods.

I claim:
1. In the separation of olefinic hydrocarbons from fluid hydrocarbons containing such which also contain hydrogen, comprising contacting said fluid hydrocarbon mixture with an aqueous solution of a silver salt selected from the class consisting of silver fluoborate, silver fluosilicate and mixtures thereof, and thereafter regenerating the silver salt solution and recovering the olefinic hydrocarbons, the step of contacting the hydrocarbon mixture with a solution of said silver salt which has been modified by the addition of pentavalent vanadium ions in sufficient concentration to prevent the reduction of silver ions and by the addition of sufficient hydrofluoric acid to maintain the vanadium ion in solution.

2. The process of claim 1 wherein the quantity of vanadium is from 0.03 to 4 weight percent, based on the aqueous solution, and the concentration of the hydrogen fluoride is at least 0.3 M.

3. The process of claim 1 wherein the reduced vanadium is regenerated to the pentavalent state by reaction with a compound selected from the class consisting of nitric acid, hydrogen peroxide and oxygen.

4. The process of claim 1 wherein the silver fluoborate solution is modified by the addition of a secondary metal fluoborate wherein the metal is a metal of group II of the periodic table of elements having atomic numbers from 4 to 56 inclusive.

5. The process of claim 4 wherein the secondary metal fluoborate is magnesium fluoborate.

References Cited in the file of this patent
UNITED STATES PATENTS

| | | |
|---|---|---|
| 2,913,505 | Van Raay et al. | Nov. 17, 1959 |
| 3,007,981 | Baker et al. | Nov. 7, 1961 |

FOREIGN PATENTS

| | | |
|---|---|---|
| 621,873 | Great Britain | Apr. 21, 1949 |